DEFENSIVE PUBLICATION T866007

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED SEPTEMBER 2, 1969

866 O.G. 22

007

751,354

INSECTICIDES AND SYNERGISTS

Ronald Eugene Montgomery, Middleport, and Harry Hobart Incho, Medina, N.Y., assignors to FMC Corporation, New York, N.Y., a corporation of Delaware

Filed Aug. 9, 1968. Published Sept. 2, 1969
Int. Cl. A01n *9/36, 9/24;* C07f *9/46*
U.S. Cl. 424—214
No Drawing. 10 Pages Specification

Synergistic insecticidal combinations of esters of chrysanthemumic acid, for example pyrethrins, allethrin, and (1-cyclohexene-1,2-dicarboximido)methyl chrysanthemumate, with certain ω-alkynyl phenyl(phenylcarbamoyl) phosphinate synergists, are described. These synergists have the general formula:

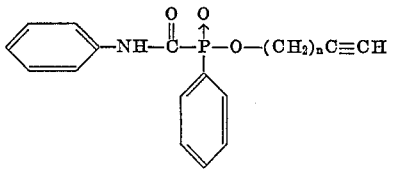

wherein *n* is an integer of one to three inclusive. The preparation of 3-butynyl phenyl(phenylcarbamoyl)phosphinate, M.P. 83–85° C., and the synergistic activity of said phosphinate with representative chrysanthemumate insecticides, are described in detail.